United States Patent [19]
Hoglund

[11] 3,741,071
[45] June 26, 1973

[54] SENSING APPARATUS FOR CENTERING A CUTTING HEAD AND TOOL WITH RESPECT TO A WORK PIECE

[75] Inventor: Nils Hoglund, Short Hills, N.J.

[73] Assignee: Hoglund Engineering and Manufacturing Company, Inc., Berkeley Heights, N.J.

[22] Filed: Nov. 12, 1970

[21] Appl. No.: 88,798

[52] U.S. Cl. .............................. 90/11 R, 51/165.92
[51] Int. Cl. .............................................. B23b 3/00
[58] Field of Search ...................... 90/11 R; 408/13; 51/165.92; 33/181

[56] References Cited
UNITED STATES PATENTS

| | | | |
|---|---|---|---|
| 2,779,040 | 1/1957 | Scarff | 408/13 |
| 3,172,240 | 3/1965 | Giardini | 51/169.92 X |
| 1,815,049 | 7/1931 | Cole | 51/165.91 |
| 2,603,043 | 7/1952 | Bontemps | 51/165.91 |

Primary Examiner—Harold D. Whitehead
Attorney—Dean S. Edmonds et al.

[57] ABSTRACT

The apparatus for positioning a cutter or milling head assembly centrally of work pieces having variable dimensions, includes a cutting or milling head assembly mounted for movement in three dimensions. The milling head and tool, during cutting operations, are movable laterally to make a cut centrally of two parallel surfaces, the thickness of the work pieces in most instances varying from work piece to work piece.

Attached to the milling head assembly by means of a carriage or slide is a sensing assembly. This assembly is movable toward and from the work piece while the milling head is displaced laterally from the work piece. The sensing assembly has cooperating sensing fingers which in their forward position engage the opposite surfaces of the work piece to determine the center line of the work piece.

This information is transmitted through a sensing valve associated with the fingers to a cooperating hydraulic motor and cam which control the vertical position of the milling head and cutter to center them with respect to the work piece, the milling head and cutter assembly being mounted on a slide controlled by the cam.

5 Claims, 8 Drawing Figures

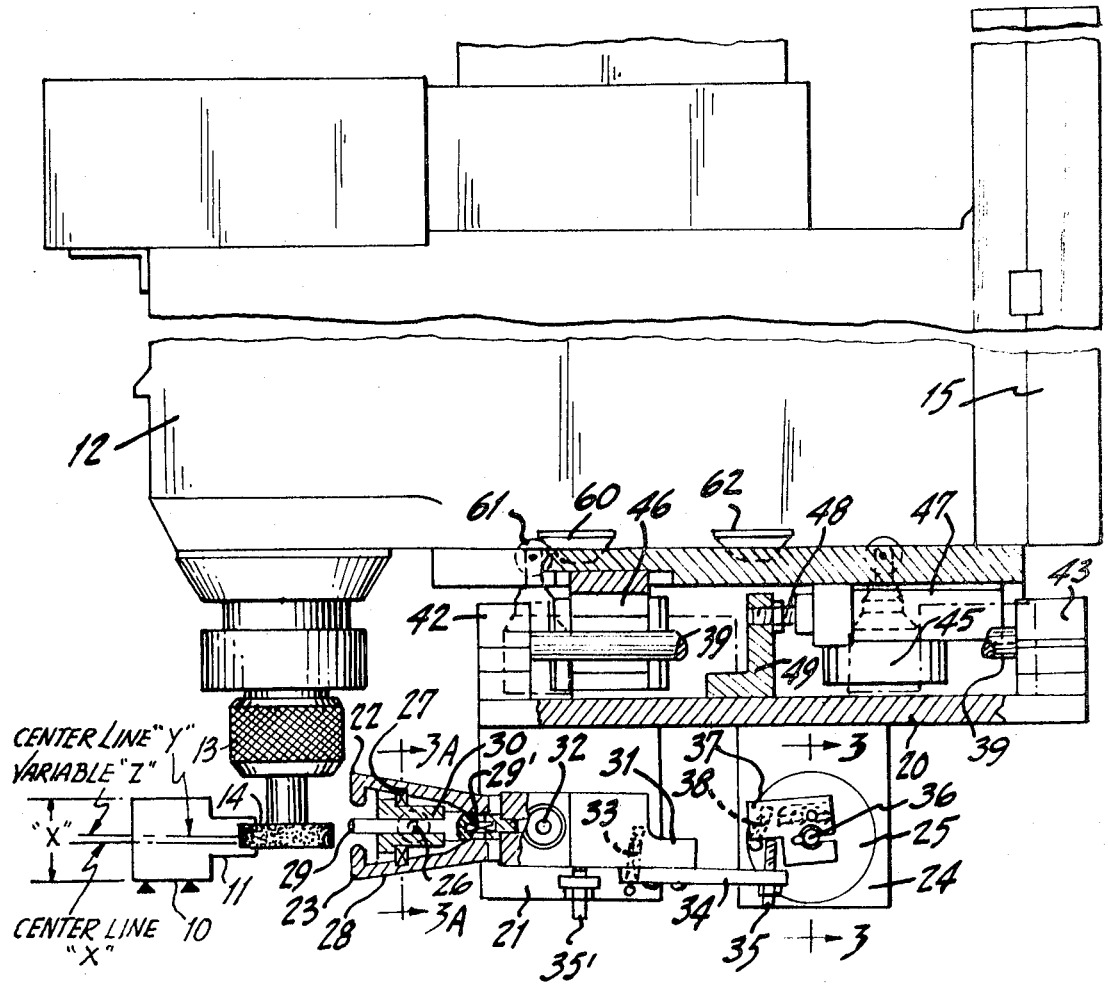
Fig.1A.
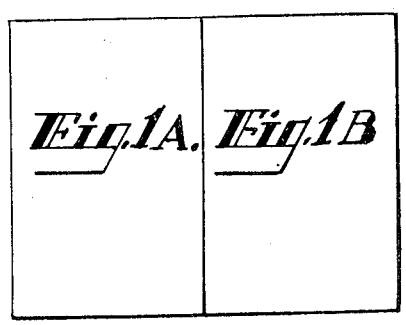

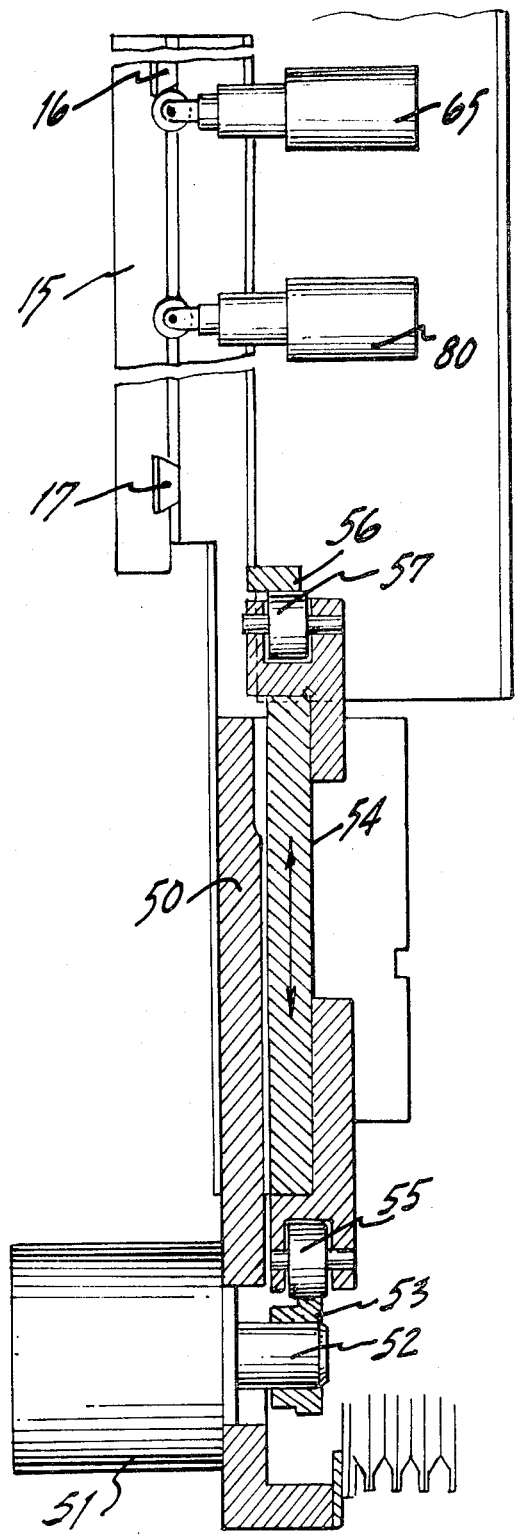

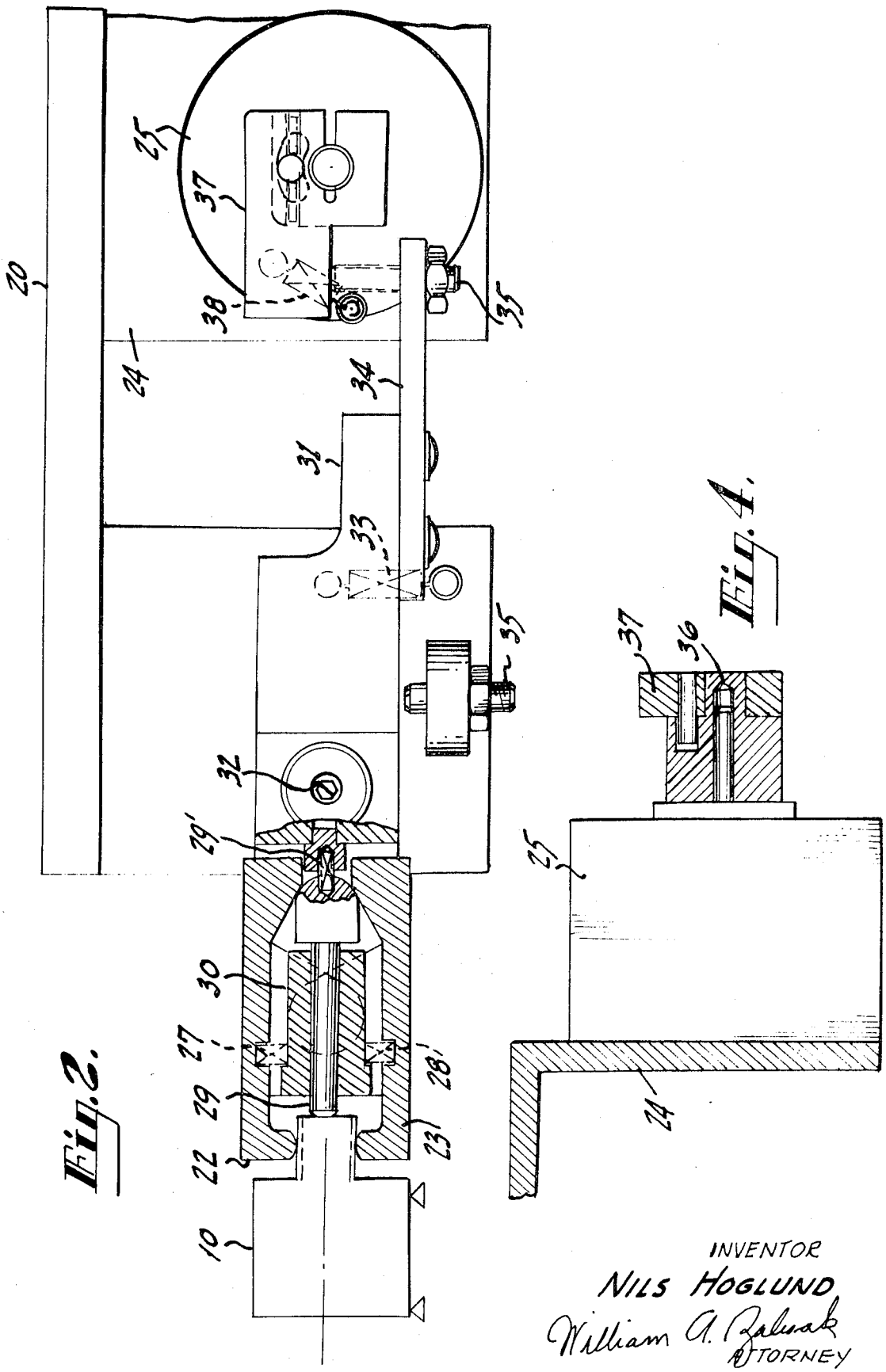

INVENTOR
NILS HOGLUND
BY William A. Zalesak
ATTORNEY 3,741,071

SENSING APPARATUS FOR CENTERING A CUTTING HEAD AND TOOL WITH RESPECT TO A WORK PIECE

BACKGROUND OF THE INVENTION

On forgings and castings, the dimensions of the thickness and other non-machined surfaces may vary depending on how the die is closed on the forging or how the mold changes during casting operations. This means that dimensions vary from part to part.

Thus, in the process of banking or locating surfaces from which all the machining operations are controlled, the locating points are not always, or very seldom, the surfaces or points which properly locate the machining operations. This condition makes it necessary to make adjustment of the cutter position from one work piece to another to insure that the cutting tool performs its operation at the exact location required on the part.

In prior automatic equipment such as three-dimensional, multi-station machinery, the cutter position cannot be adjusted manually. It was, therefore, necessary to design a mechanism which would sense the surfaces of the part to be cut and automatically adjust the position of the cutter to the part or work piece to be cut.

SUMMARY OF THE INVENTION

The apparatus to be described which insures proper positioning of a cutter or miller relative to a work piece, includes a cutter head assembly movable in three dimensions and capable of making a lateral cut. This assembly is mounted on a slide for vertical movement.

Mounted on the milling or cutter head assembly is a sensing subassembly which controls the accurate positioning of the cutter. This sensing subassembly includes a slide mounted on the cutter head assembly and moves vertically with it. Mounted on the sensing slide is a sensing mechanism including a pair of oppositely disposed sensing fingers which engage opposite surfaces of the work piece when the sensing assembly slide is in a forward or sensing position.

The sensing subassembly includes a sensing valve coupled to the fingers. This sensing valve is in turn coupled to a hydraulically actuated motor. This motor controls a rotatable cam associated with the milling head assembly by means of a slide and follower. Information received by the sensing fingers is transmitted by fluid means to the hydraulic motor by the sensing valve to determine the position of the cam and thus the vertical position of the cutter head and cutter relative to the work piece.

During the sensing operation, the milling head assembly is positioned laterally of the work piece and does not move into the work piece until the sensing operation is completed and the sensing slide is retracted.

BRIEF DESCRIPTION OF THE DRAWINGS

The invention will be described in connection with the accompanying drawings showing one embodiment of my invention:

FIGS. 1A and 1B show a side view partially in section of one form of apparatus made according to my invention and taken along the line 1 — 1 of FIG. 3 and showing the sensing fingers in retracted position;

FIG. 2 partially in section shows the sensing fingers in contact with a work piece and in centered position;

FIG. 4 is a section along the line 3 — 3 of FIG. 1 showing the sensor valve;

DESCRIPTION OF THE PREFERRED EMBODIMENT

Figure 3:
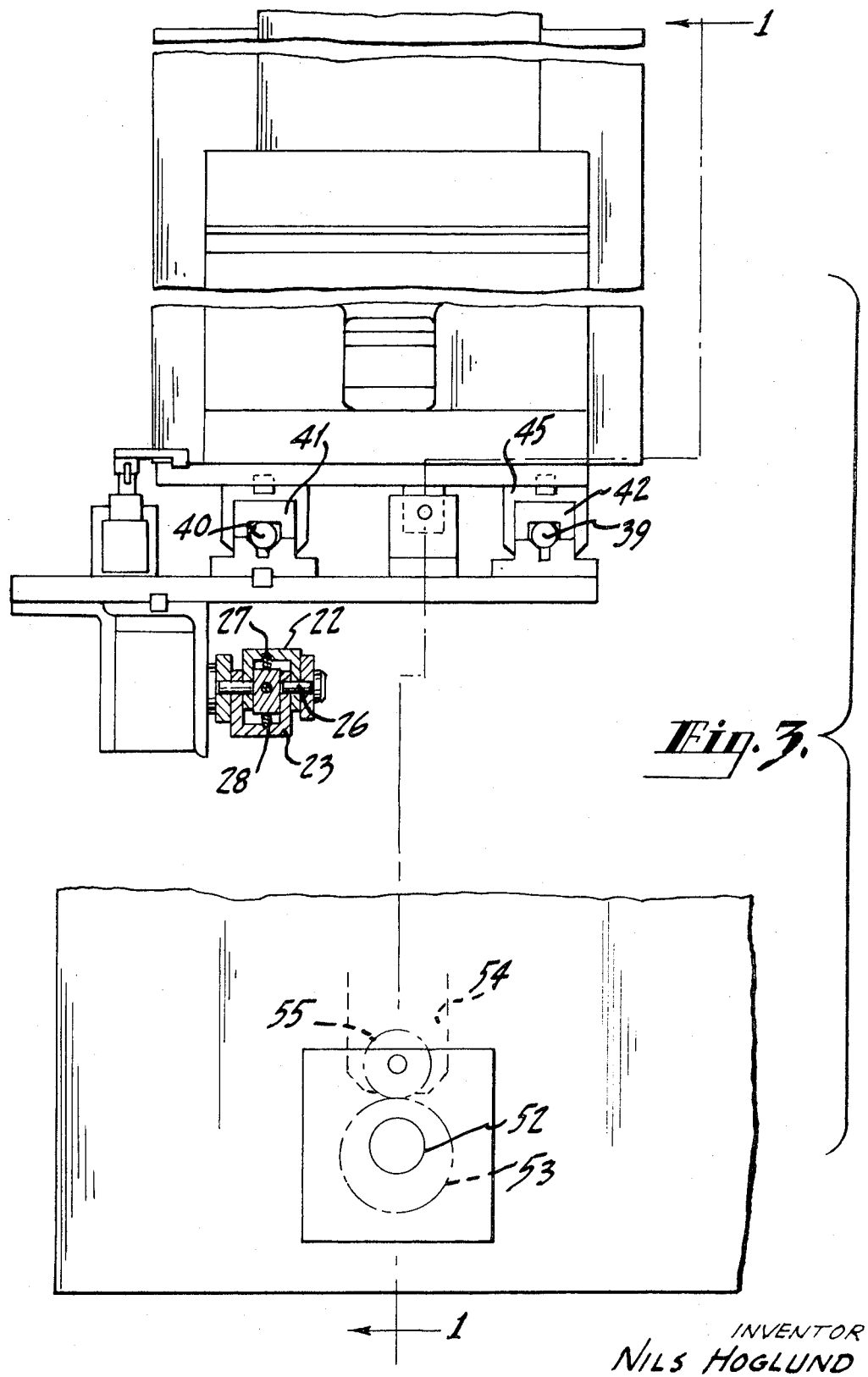
FIG. 3 is an end view of FIG. 1 with the sensing fingers in section along line 3A — 3A of FIG. 1.

Referring to FIGS. 1A, 1B and 2, the problem will first be described. As shown in FIGS. 1A and 1B, the sensing subassembly, which will be described below is shown in retracted position. The workpiece 10 is located on its lower surface. The locating surface is indicated by the black triangles. The protruding portion 11 has a different centerline from the rest of the workpiece as shown by the Z variable due to error in the die closing. The thickness of the protrusion 11 also varies from workpiece to workpiece as shown by the Y variable, the centerline of the workpiece. The protrusion may be thick or thin; however, the milling cut must be central with respect to the thickness Y. To accomplish the centralizing of the milling cutter relative to the protrusion 11, the spindle which holds the cutter must move up or down before making the cut.

The apparatus made according to my invention includes a milling head 12, having a spindle 13 carrying a cutting tool 14. The milling head assembly is mounted on a vertically movable slide 15, having attached thereto trip dogs 16 and 17, the function of which will be described below.

The sensing assembly is mounted on a plate or sensing slide 20 movable toward and from the workpiece. A bracket 21 attached to slide 20 supports the pivoted sensing fingers 22 and 23. Bracket 24 attached to slide 20 supports the servo or sensing valve 25. Thus, the sensing fingers and sensing valve move together toward a workpiece and also up and down with the milling head assembly.

Figure 5:
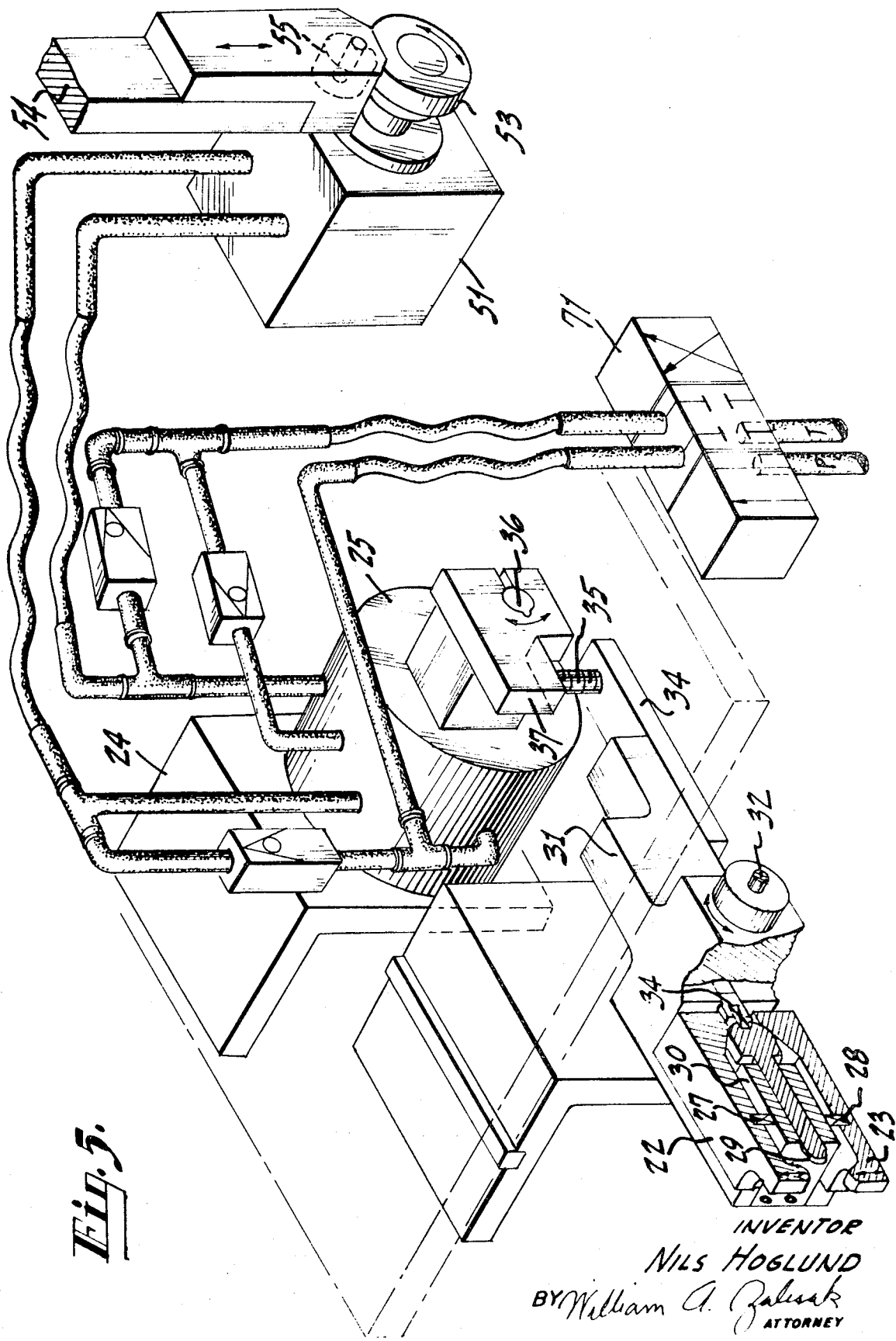
FIG. 5 is a perspective schematic showing the sensing fingers partly in section, the hydraulic motor and cam for controlling the position of the cutter head assembly slide, and the hydraulic system associated with these elements.
Figure 6:
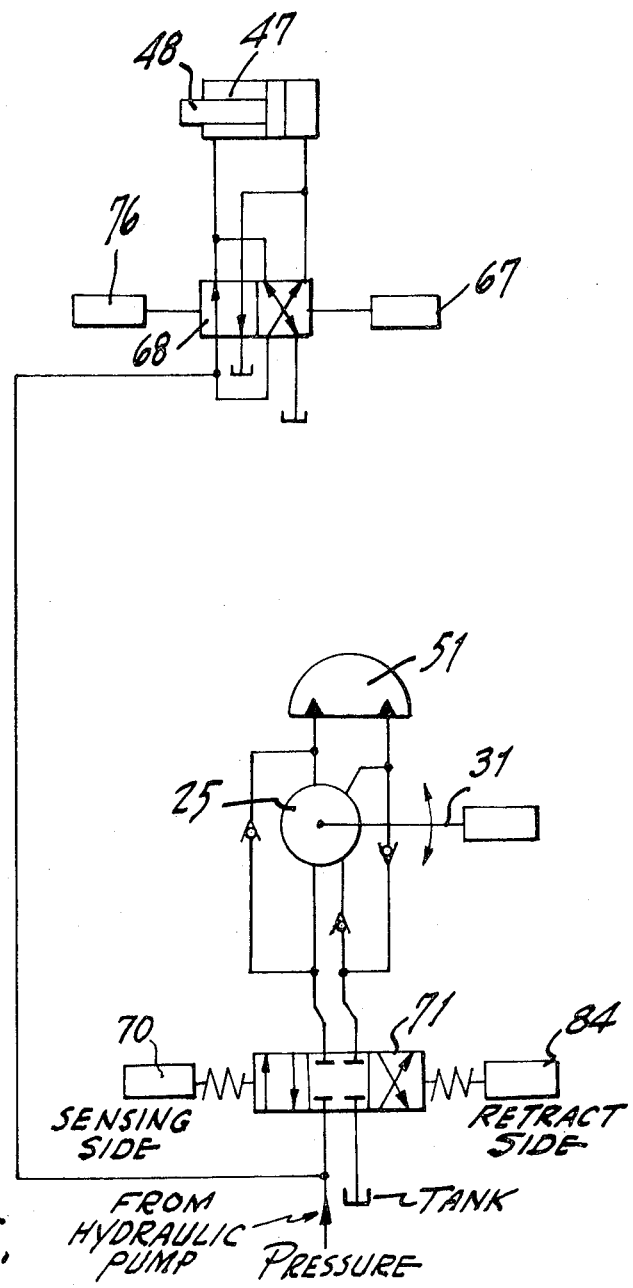
FIG. 6 is a hydraulic schematic for the whole sensing system.

The sensing fingers 22 and 23 are individually movable toward and from each other around the pivot 26 and are held apart by the springs 27 and 28. A plunger 29 is free to slide in block 30 secured to the pivoting or leverage arm 31 (See FIG. 5.). This arm is pivoted on pivot 32; and biased upwardly by the spring 33 connected between the arm 31 and the bracket 21. A spring 29' biases the plunger 29 outwardly toward the work piece. The leverage arm 31 is provided with an extension 34 having an adjustable set screw 35 mounted thereon. Stop screw 35' limits the off centerline position of the sensing fingers. The purpose of the sensing mechanism so far described is to control the operation of the sensing valve 25.

The sensing valve 25 controls the flow of fluid under pressure to a hydraulic motor, to be described for properly positioning the cutter prior to cutting operations. The sensing valve has connected to its shaft 36 the actuating arm 37 which contacts the set screw 35. Spring 38 urges one actuating arm 37 against the set screw. Spring 38 is connected between bracket 24 and arm 37. In operation, depending upon the position of the set screw 35 the valve 25 may be in a position to permit flow of fluid under pressure to or from the hydraulic motor to be described or may be in a null position blocking the flow of fluid.

The sensing slide 20 is slidably mounted on the milling head assembly. This slide is attached to two hardened steel rods 39 and 40 secured to the plate 20 by brackets 41, 42, 43 and a fourth bracket not shown but positioned oppositely of bracket 43. This assembly is supported from the milling head assembly by ball bushings such as 45 and 46 and two others not shown but located at the right of ball bushings 45 and 46 as viewed in FIG. 1A. To move slide or plate 20 toward or from the work piece, a hydraulic cylinder 47 is secured to the milling head assembly at one end and the piston rod 48 to the slide 20 by means of bracket 49. When the piston is actuated, it moves the entire sensing subassembly toward and from the work piece.

Mounted adjacent the milling head assembly on support 50 is the hydraulic motor 51 having a shaft 52, to which is fixed the spiral cam 53. The hydraulic motor has a limited amount of rotation, approximately 280° and rotates clockwise and counterclockwise depending upon how the hydraulic pressure is applied to the port of the motor. A vertically movable slide 54 is provided at its lower end with a roller follower 55 in contact with the cam 53. The milling head assembly can be moved vertically by means of a hydraulic cylinder such as shown in FIG. 4a of my U.S. Pat. No. 3,169,448. When the piston, not shown in the present drawings, is retracted, the milling head assembly moves downwardly until the bar 56 on the cutter assembly slide 15 contacts the roller 57 on slide 54. The cam is in such a position at this time that it allows the slide 54 to be at the lowest position on cam 53. Rotation of the cam 53 raises and lowers the cutter or milling head assembly and sensing subassembly to move up and down through small distances to center the cutting tool relative to the work piece. A timer to be described prevents the cutting tool from moving into cutting position until the sensing fingers are retracted after the centering operation.

As shown in FIGS. 1A, 1B and 2, when the milling head and sensing subassembly move to their lowest position, circuits to be described cause the sensing slide 20 and sensing fingers 22 and 23 to move toward the work piece.

As the slide 20 moves in the direction of the work piece, the sensing device is in a free position before it contacts the work piece. The spring 33 pulls the lever arm 31 upwardly. Spring 38 moves the servo-valve shaft 36 counterclockwise lifting the sensing device above the excepted centerline of the protrusion on the part to be cut. This causes the servo valve 25 to feed hydraulic pressure into the hydraulic motor 51 which thereby rotates the cam 53 in such a manner that the milling head 12 will position the cutter lower than is required for finishing the part at the right dimension. Stop screw 35' limits the off centerline condition. As the slide 20 keeps moving forward, plunger 29 contacts the edge of the work piece which pushes plunger 29 in the opposite direction of the movement of the carriage or slide compressing spring 29' causing the sensing fingers 22 and 23 to close due to the action of the radius of the end of plunger 29 against the angular portion of the sensing fingers 22 and 23, closing the sensing fingers until they contact the work piece. The centerline of the sensing device through the pivot point 32, pivot point 26 and the two sensing fingers remain in line.

If the centerline between fingers 22 and 23, pivot 26 and pivot 32 are not in line with the centerline of the servo valve 25, set screw 35 will keep its center point above or below that centerline causing hydraulic pressure to be transmitted by the servo valve to the hydraulic motor 51 rotating cam 53 so that slide 54 will raise or lower the milling head assembly 12 and thereby lower or raise the sensing device, thus lifting or lowering the pivot point 32 until all centerlines are in line where the null position of the servo valve 25 occurs. This is shown in FIG. 2. When this occurs, the servo valve 25 prevents any pressure being transmitted to the hydraulic motor 51. This action thereby holds the spiral cam 53 at a fixed position establishing the centerline of the protrusion of the work piece and the milling cutter or any other cutting tool that is being used.

When the condition exists, the fingers return to retracted position as shown in FIG. 1, since the timer will have energized the circuits to return slide or carriage 20 to retracted position. This causes trip dog 60 to engage limit switch 61 to set up the starting circuit. Trip dog 62, when the slide 20 is forward in sensing position, will engage limit switch 63 when the carriage or slide is in sensing position. Switches 61 and 63 are mounted on the carriage 20. Trip dogs 60 and 62 are fixed to the milling head assembly.

ELECTRIC AND HYDRAULIC CONTROLS

Figure 7:
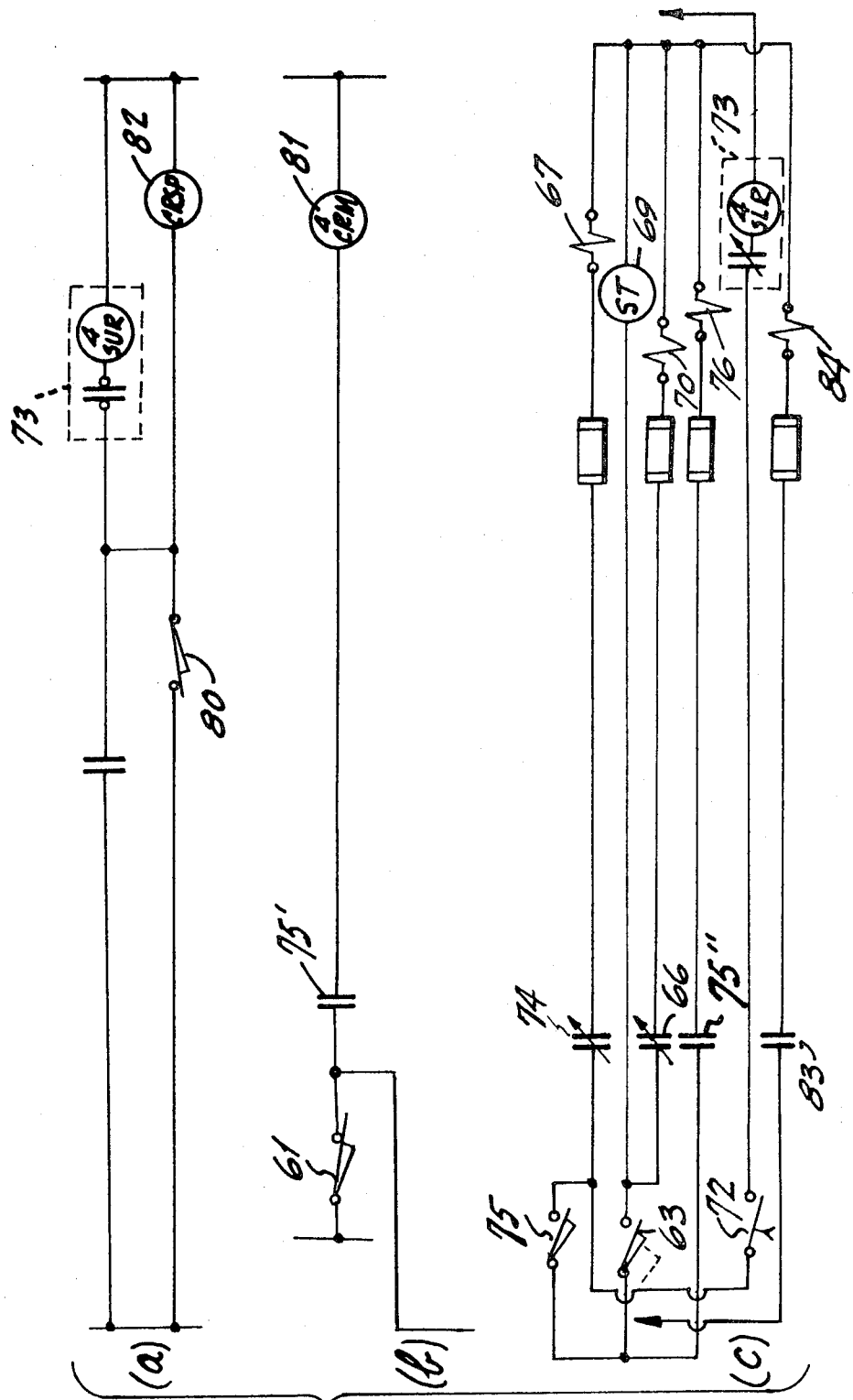
FIG. 7 is a circuit diagram for the sensing system.

Referring to FIGS. 1, 3, 6 and 7, the circuits are set up for the beginning of the cycle when carriage or sensing slide 20 is in the retracted position as shown in FIG. 1. Under these conditions, the circuit diagram FIG. 7 shows all of the contacts in position for the start of the cycle.

When the cycle is started, the milling head assembly 12 and slide 15 move downwardly. Tripper dog 16 closes switch 65. Since contacts 66 and 74 are closed, solenoid 67 becomes energized. The spool of valve 68 is shifted putting pressure on the right hand side of cylinder 47 causing piston rod 48 and slide 20 to move to the left bringing the sensing fingers to sensing position.

As the carriage or slide 20 moves to the left, dog 62 contacts switch 63 closing it. This energizes the sensor timer 69. Since contacts 66 are closed, solenoid 70 becomes energized. This action shifts the spool in valve 71 so that the pressure will go up on the right hand slide of servo valve 25 and allows the return flow to the tank through the valve.

The mechanism consisting of the sensing fingers 22, 23, the leverage arm 37 of the servo valve 24 will cause the flow of fluid under pressure to the hydraulic motor 51 until the servo valve has reached a null position.

At the end of the timing period, during which period the milling head has been properly positioned, the timer 69 closes switch 72. This energizes and latches in latch 73. As a result, contacts 74 and 66 are opened and 75 and 75' closed. Sensor retract solenoid 76 is energized. This causes fluid under pressure to enter the left side of cylinder 47 to retract the carriage 20.

As the carriage or slide 20 moves to the right to its retracted position, switch 63 opens. This deenergizes the sensor timer 69 and opens switch 72. When the slide 20 reaches its retracted position, switch 61 is closed, and since contacts 75 and 75' are closed, the cam motor 81 causes the milling head to move into the work piece and return.

At this point, slide 15 moves upwardly opening switch 65. When the milling head assembly and slide 15 reach their upper position, dog 17 closes limit switch 80. This energizes relay 82 closing contacts 83. The solenoid 84 puts the spool in valve 71 in position so that hydraulic pressure is made to bypass through the check valves directly through the hydraulic motor 51 rotating it to the position where the cam 53 will be in its lowest position. When switch 80 is closed, 73 unlatches, contacts 75 and 75' open and contacts 74 and 66 close. This places the apparatus in position for recycling.

What is claimed is:

1. Sensing apparatus for centering a cutting head and tool with respect to work pieces having parallel surfaces including:
   a. a milling head assembly movable in at least two directions;
   b. a first slide movable in one of said directions, said milling head assembly being mounted on said first slide;
   c. a motor having a cam supported adjacent said first slide;
   d. a second slide having followers thereon, one of said followers engaging said cam and the other of said followers contacting said first slide;
   e. a third slide mounted on said first slide and movable therewith;
   f. sensing fingers movable toward and from each other mounted on said third slide;
   g. a sensing valve on said third slide;
   h. connections between said motor having a cam and said sensing valve for controlling operation of said motor having a cam; and
   i. connections between said sensing fingers and said sensing valve for transferring information from said sensing fingers to said sensing valve for controlling operation of said motor to position the milling head assembly relative to a work piece.

2. Sensing apparatus for centering a cutting head and tool with respect to work pieces having parallel surfaces including:
   a. a milling head assembly;
   b. a first slide movable in one direction, said milling head assembly being mounted on said first slide;
   c. a motor having a cam supported adjacent said first slide;
   d. a second slide having oppositely disposed followers thereon, one of said followers engaging said cam and the other of said followers contacting said first slide;
   e. a third slide mounted on said first slide and movable therewith;
   f. sensing fingers movable toward and from each other mounted on said third slide;
   g. a sensing valve on said third slide; and
   h. connections between said motor having a cam and said sensing valve for controlling operation of said motor having a cam.

3. Cutting apparatus having means for locating the cutting position of a cutting tool, said apparatus including:
   a. a first slide having a cutting tool assembly mounted thereon;
   b. a second slide on said first slide;
   c. means connected between said first and second slides for moving said second slide to and from a work piece;
   d. a valve mounted on said second slide for controlling the flow of fluid under pressure;
   e. a sensing mechanism mounted on said second slide, including:
   f. oppositely disposed sensing fingers for contacting oppositely disposed parallel surfaces of a work piece said fingers being oppositely disposed and pivoted at one end;
   g. means connecting said sensing fingers and said valve for controlling fluid under pressure through said valve;
   h. a third slide mounted adjacent said first slide and having oppositely disposed followers thereon;
   i. a fluid pressure operated motor and cam mounted adjacent said third slide, one of the followers on said third slide contacting said first slide and the other of said followers engaging said cam; and
   j. connections between said valve and said motor for transmitting fluid under pressure between said valve and said motor for locating the position of the cutting tool.

4. Cutting apparatus having means for locating the cutting position of a cutting tool, said apparatus including:
   a. a first slide having a cutting tool assembly mounted thereon;
   b. a second slide on said first slide movable transversely of said first slide;
   c. pressure operated means connected between said first and second slides for moving said second slide to and from a work piece;
   d. a valve mounted on said second slide for controlling the flow of fluid under pressure;
   e. a sensing mechanism mounted on said second slide, including:
   f. oppositely disposed sensing fingers for contacting oppositely disposed parallel surfaces of a work piece, said fingers being oppositely disposed and pivoted at one end;
   g. means connecting said sensing fingers and said valve for controlling fluid under pressure through said valve;
   h. a third slide mounted adjacent said first slide and having oppositely disposed followers thereon;
   i. a fluid pressure operated motor and cam mounted adjacent said third slide, one of the followers on said third slide contacting said first slide and the other of said followers engaging said cam; and
   j. connections between said valve and said motor for transmitting pressure between said valve and said motor for locating the position of the cutting tool.

5. Cutting apparatus having means for locating the cutting position of a cutting tool, said apparatus including:
   a. a first slide having a cutting tool assembly mounted thereon;
   b. a second slide on said first slide movable transversely of said first slide;
   c. pressure operated means connected between said first and second slides for moving said second slide to and from a work piece;
   d. a valve mounted on said second slide for controlling the flow of fluid under pressure;

e. a pivoted sensing mechanism mounted on said second slide, including:
f. oppositely disposed sensing fingers for contacting oppositely disposed parallel surfaces of a work piece, said fingers being oppositely disposed and pivoted at one end;
g. means connecting said sensing fingers and said valve for controlling fluid under pressure through said valve;
h. a third slide mounted adjacent said first slide and having oppositely disposed followers thereon;
i. a fluid pressure operated motor and cam mounted adjacent said third slide, one of the followers on said third slide contacting said first slide and the other of said followers engaging said cam;
j. connections between said valve and said motor for transmitting fluid under pressure between said valve and said motor for locating the position of the cutting tool; and
k. electrical means associated with said cutting apparatus including switches and trip dogs associated with said slides for determining the sequence of operation of the cutting apparatus.

* * * * *